US010651718B2

(12) United States Patent
Villaret

(10) Patent No.: US 10,651,718 B2
(45) Date of Patent: May 12, 2020

(54) TRANSVERSE FLUX LINEAR MOTOR

(71) Applicant: MOTX Ltd., Petach-Tikva (IL)

(72) Inventor: Yves Villaret, Hadera (IL)

(73) Assignee: MOTX Ltd., Givat Shmuel (IL)

( * ) Notice: Subject to any disclaimer, the term of this patent is extended or adjusted under 35 U.S.C. 154(b) by 204 days.

(21) Appl. No.: 15/579,603

(22) PCT Filed: Jul. 18, 2016

(86) PCT No.: PCT/IL2016/050783
§ 371 (c)(1),
(2) Date: Dec. 5, 2017

(87) PCT Pub. No.: WO2017/013646
PCT Pub. Date: Jan. 26, 2017

(65) Prior Publication Data
US 2018/0166963 A1 Jun. 14, 2018

Related U.S. Application Data

(60) Provisional application No. 62/194,300, filed on Jul. 20, 2015.

(51) Int. Cl.
*H02K 41/02* (2006.01)
*H02K 41/03* (2006.01)
(52) U.S. Cl.
CPC .......... *H02K 41/031* (2013.01); *H02K 41/03* (2013.01)
(58) Field of Classification Search
CPC ...... H02K 41/03; H02K 41/02; H02K 41/031; H02K 2201/12
See application file for complete search history.

(56) References Cited

U.S. PATENT DOCUMENTS

| 4,908,533 | A | 3/1990 | Karita et al. |
| 5,854,521 | A | 12/1998 | Nolle |
| 8,810,082 | B2 * | 8/2014 | Aoyama ................ H02K 41/03 310/12.22 |
| 9,252,650 | B2 | 2/2016 | Villaret |
| 2002/0050804 | A1 | 5/2002 | Joong et al. |
| 2002/0053445 | A1 | 5/2002 | Kim et al. |
| 2002/0053835 | A1 | 5/2002 | Joong et al. |

(Continued)

FOREIGN PATENT DOCUMENTS

| CN | 1473386 | 2/2004 |
| CN | 102246401 | 11/2011 |

(Continued)

OTHER PUBLICATIONS

International Preliminary Report on Patentability dated Jun. 30, 2017 From the International Preliminary Examining Authority Re. Application No. PCT/IL2016/050783. (10 Pages).

(Continued)

Primary Examiner — Dang D Le

(57) ABSTRACT

An Electrical Linear Motor having a number of electrical windings with long linear sections arranged parallel to the linear path of the motor. A row of equidistant magnets parallel to the linear path and having alternating magnetic field direction perpendicular to the linear path of the motor is provided. A number of magnetic circuits each enclose some of the long linear winding sections, further referred as "set of long linear sections". Any two of these magnetic circuits enclose a different set of long linear sections. Each magnetic circuit is provided with an opening receiving the magnet row. The magnet row and the magnetic circuits slide along the linear path relatively to each other to vary working force. A required force value is obtained by controlling the current in the windings for each position of the moving row relative to the magnetic circuits.

15 Claims, 15 Drawing Sheets

(56) References Cited

U.S. PATENT DOCUMENTS

| | | | | |
|---|---|---|---|---|
| 2003/0127917 A1* | 7/2003 | Kang | .................... | H02K 41/03 310/12.25 |
| 2007/0114854 A1 | 5/2007 | Miyamoto | | |
| 2011/0241449 A1 | 10/2011 | Aoyama et al. | | |
| 2012/0205992 A1* | 8/2012 | Villaret | .................. | H02K 21/44 310/12.18 |
| 2014/0225459 A1 | 8/2014 | Kawakami | | |

FOREIGN PATENT DOCUMENTS

| | | |
|---|---|---|
| CN | 102292900 | 12/2011 |
| DE | 102008012324 | 9/2009 |
| JP | 2002-027729 | 1/2002 |
| WO | WO 2017/013646 | 1/2017 |

OTHER PUBLICATIONS

International Search Report and the Written Opinion dated Jan. 13, 2017 dated Oct. 2015 From the International Searching Authority Re. Application No. PCT/IL2016/507839. (8 Pages).

Notification of Office Action and Search Report dated Jun. 4, 2019 From the China National Intellectual Property Administration Re. Application No. 201680043091.4 and Its Translation Into English. (16 Pages).

Supplementary European Search Report and the European Search Opinion dated Jan. 25, 2019 From the European Patent Office Re. Application No. 16827360.5. (9 Pages).

Translation Dated Sep. 26, 2019 of Notice of Submission of Argument dated Jul. 25, 2019 From the Korean Intellectual Property Office Re. Application No. 10-2018-7004199. (2 Pages).

Examination Report Under Sections 12 & 13 of the Patents Act, 1970 and the Patents Rules, 2003 dated Oct. 18, 2019 From the Government of India, Intellectual Property India, Patents, Designs, Trade Marks, Geographical Indications Re. Application No. 201847005737. (5 Pages).

Notice of Submission of Argument dated Jul. 25, 2019 From the Korean Intellectual Property Office Re. Application No. 10-2018-7004199 and Its Summary in English. (6 Pages).

* cited by examiner

TRANSVERSE FLUX LINEAR MOTOR

FIELD OF THE INVENTION

The present invention relates generally to electrical motors, and more particularly, but not exclusively, to transverse flux machines in which the electromagnetic force vector is perpendicular to the magnetic flux lines.

BACKGROUND OF THE INVENTION

Linear motion systems are in common use in industry, with different systems available to handle a variety of applications.

One type of system uses a ball and screw arrangement, in which the ball screw is rotated by a static rotary motor. An advantage of this arrangement is that the electric cables that drive the system are static, and therefore may be fixed to the main body of the machine. Some of the disadvantages however include limits in speed, and relatively high vibration, friction, and acoustic noise.

Where faster speed and smooth, high precision movements are required, electric motors having a stationary element and movable element are frequently employed. In some linear motors, for example, the movable element includes a current-carrying winding wrapped around a magnetic core of magnetizable material such as iron or steel, and the stationary element contains permanent magnets.

These linear motors have a disadvantage however in that the movable winding needs to be connected by cable to the driver current of the motor. In order to avoid deterioration of the connecting cables, a cable arrangement that is costly and complicated is usually required. Further, the cable connection creates mechanical friction and perturbations that affect the smoothness of the motor movement. An alternative type of linear electric motor reverses placement of the components, by placing the windings and magnetic core on the stator and the permanent magnets on the moving element. An example of this motor configuration is shown in US patent application US2007/0114854 to Miyamoto. A problem with this configuration, however, is that the windings and magnetic core are disposed all along the full length of the linear motor. Windings are usually wound around magnetic poles covering all the length of the electric motor. This makes the motor relatively heavy and expensive. Further, these motors have low efficiency since only the small section of the winding that is in front of the moving element is active.

Both of these common types of linear motor also have a strong attraction force between the moving and the static elements. The attraction force acts as a friction constraint on movement, requiring additional current input to overcome, which further reduces motor efficiency.

In my U.S. Pat. No. 9,252,650 (Villaret), there is described a linear motor that provides a transverse flux linear motor of high efficiency; in one embodiment, the moving carriage pushing force is provided by three magnetic circuits, each one having an opening inside which a row of magnets is inserted, and slide along the magnet row.

A feature of this configuration is to eliminate the need for moving cables.

Another feature is that the heating due to the thermal losses of the winding is not directly conducted to the carriage, resulting in a lower temperature.

However, the heat developed by the magnetic losses inside the magnetic material are still conducted to the carriage, resulting in a reduced but still problematic carriage temperature rise.

Another problem with this arrangement is that there are typically three (or at least two) rows of magnets. The pushing force is consecutively applied on the carriage at the respective opening of each row. This successive application of the pushing force to different positions of the carriage results in vibrations during the movement.

A further problem with this arrangement is the mechanical complexity. As will be shown, the extremities of the magnetic circuit are subject to strong and oscillating forces perpendicular to the movement path. This requires a stiff supporting frame to avoid vibrations. Implementing a stiff frame results in a heavy, complex and high cost structure.

Another problem with this arrangement is the mechanical mounting.

The assembly process is complex because the volume of space left between the rows is not accessible, A further problem with this arrangement is that three magnet rows are required, thus adding cost.

Typical linear motors include current carrying coils wound around magnetic material. The magnetic material end sections called poles are moving on a linear path in proximity to a row of permanent magnets. The interaction between the magnetic field of magnets and the magnetic field in the pole proximity creates the working force. Typically, these motor poles are divided in three "phase" groups. A phase current of a three phase current generator is driven in each pole coil.

A limitation of this type of motor is that the number of poles per length unit is limited due to the size of the coils surrounding the poles. In order to produce a high force, it would be desirable to use a large number of poles, but coil size limits this number.

Therefore, these type of motors use large magnets and large poles, in order to be able to develop a sufficient working force. Large and strong permanent magnets have a high cost and are difficult to manipulate, which results in a high manufacturing cost.

Transverse flux motors make use of windings that extend along the movement path. Examples of that type linear motor are described in U.S. Pat. No. 5,854,521 by Nolle and U.S. Pat. No. 9,252,650 by Villaret. In these motors, the number of poles is not limited by the windings; this is because the same winding linear sections can extend over a large number of poles. It is thus possible to design the motor with a large number of poles, each pole being of small size. Consequently, permanent magnets are also of small size and lower cost. Furthermore, the same winding acts over all poles of the same phase, so that the number of windings is reduced to the number of phases. The winding shape is simpler and reduces the winding manufacturing cost.

A further advantage of the design presented in U.S. Pat. No. 9,252,650 by Villaret is that it is possible to make a linear motor without moving cables. The carriage does not need an electric feed. This improves the reliability and smoothness of movement. The cost of the moving cable arrangement is also avoided.

However, the linear motor described by Villaret still has the following disadvantages:

In a first aspect, the heat developed by the magnetic losses inside the magnetic material is still conducted to the carriage, resulting in some reduced but still problematic carriage temperature rise.

In a second aspect, there are typically three (or at least two) rows of magnets. The pushing force is consecutively applied on the carriage at the respective opening of each row. The successive applications of the pushing force to different lateral positions of the carriage create torsional torque and result in vibrations during the movement.

A further disadvantage of this linear motor is the mechanical complexity. As will be shown below, the extremities of the magnetic circuit are subject to strong and oscillating forces perpendicular to the movement path. This requires a stiff supporting frame to avoid vibrations. Implementation of a stiff frame results in a heavy, complex and high cost structure.

In another aspect of the mechanical mounting, the volume of space between the rows is not accessible, and this makes the assembly process complex. In order to make insertion of the winding possible, it is necessary to divide the magnetic circuits in several sections that can be re-assembled after inserting the winding. Assembling all these sections together, while the volume underneath the central part of the motor is not accessible, is a complex and thus costly procedure.

A further disadvantage of this embodiment is that three magnet rows are required, thus adding cost.

SUMMARY OF THE INVENTION

The object of the present invention is an improved type of transverse flux linear motor.

In a preferred embodiment of the present invention, there is provided an Electrical Linear Motor having a number of electrical windings with long linear winding sections. The long linear winding sections are arranged parallel to the linear path of the motor.

A single row of equidistant magnets (magnet row), placed in periodic position parallel to the linear path and having alternating magnetic field direction perpendicular to the linear path of the motor is provided.

A number of magnetic circuits are provided; each magnetic circuit encloses a number of the long linear winding sections, further referred as "set of long linear sections", and at least two of these magnetic circuits enclose a different set of long linear sections. Each magnetic circuit is provided with an opening receiving the magnet row. The magnet row and the magnetic circuits slide along the linear path relatively to each other.

In a first embodiment, the magnet row is moveable along the path and fixed to a moving carriage; the windings and magnetic circuits are static.

In a second embodiment, the carriage is fixed to the magnetic circuit and is moveable along the path; the windings and permanent magnet row are static.

In a third embodiment, the windings and magnetic circuits are fixed to the carriage and moveable along the path; the magnet row is static.

Working force between static and moving elements is obtained by applying current in the windings; each magnetic circuit produces a force as a function of the position of the magnet row and the instantaneous current amplitude at that position in the enclosed long linear winding sections. The working force is the sum of all the forces produced by all the magnetic circuits and a required force value is obtained by controlling the amplitude of the current in all windings in relation to the position of the moving row relative to the magnetic circuits.

Additional features and advantages of the invention will become apparent from the following drawings and description.

BRIEF DESCRIPTION OF THE DRAWINGS

For a better understanding of the invention with regard to the embodiments thereof, reference is now made to the accompanying drawings, in which like numerals designate corresponding elements or sections throughout, and in which.

DETAILED DESCRIPTION OF THE INVENTION

The present invention provides an improved type of transverse flux motor.

Figure 1:
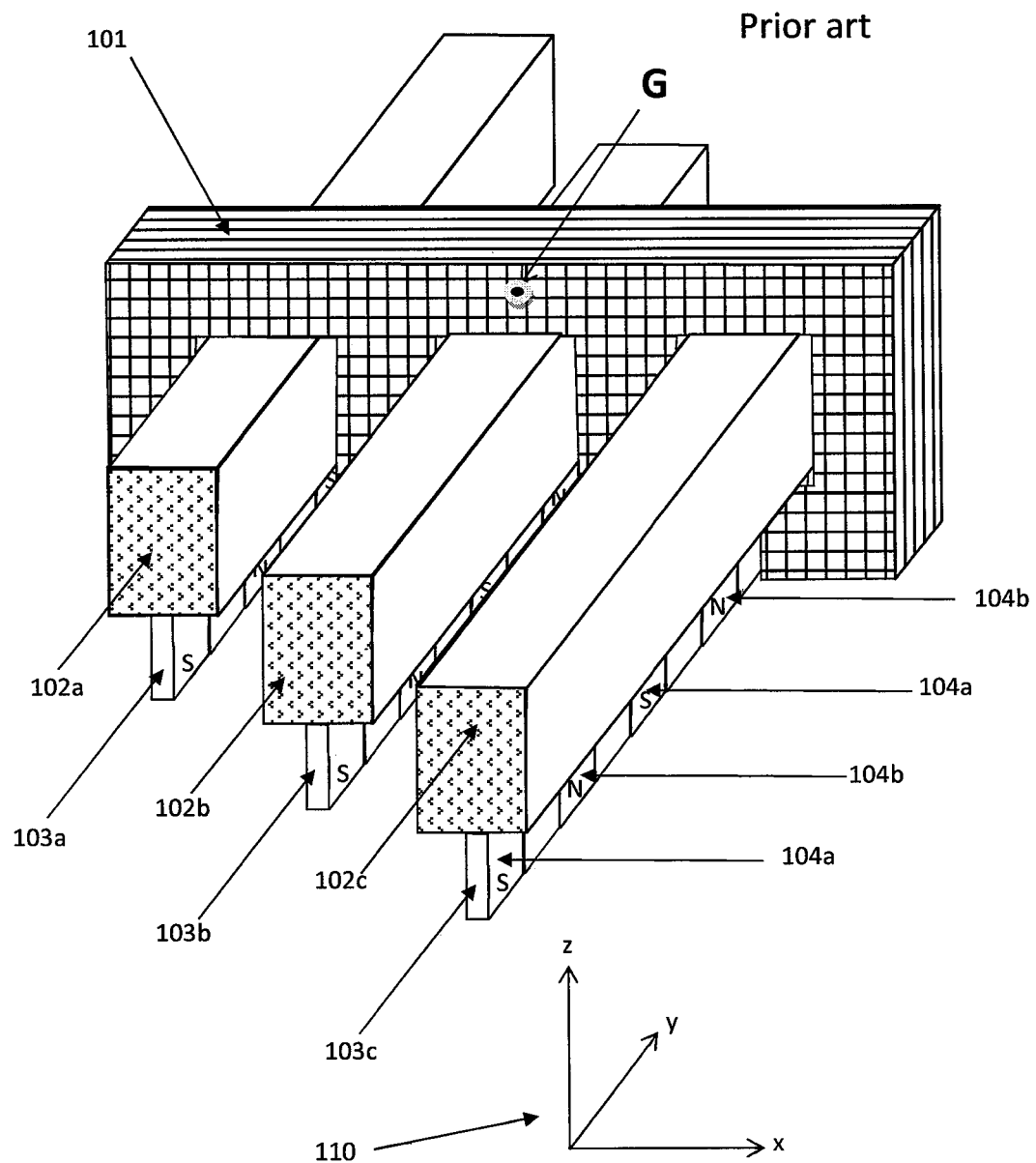
FIG. 1 is a perspective view of the prior art from US 2012/0205992 A1 by Villaret.
Figure 1A:
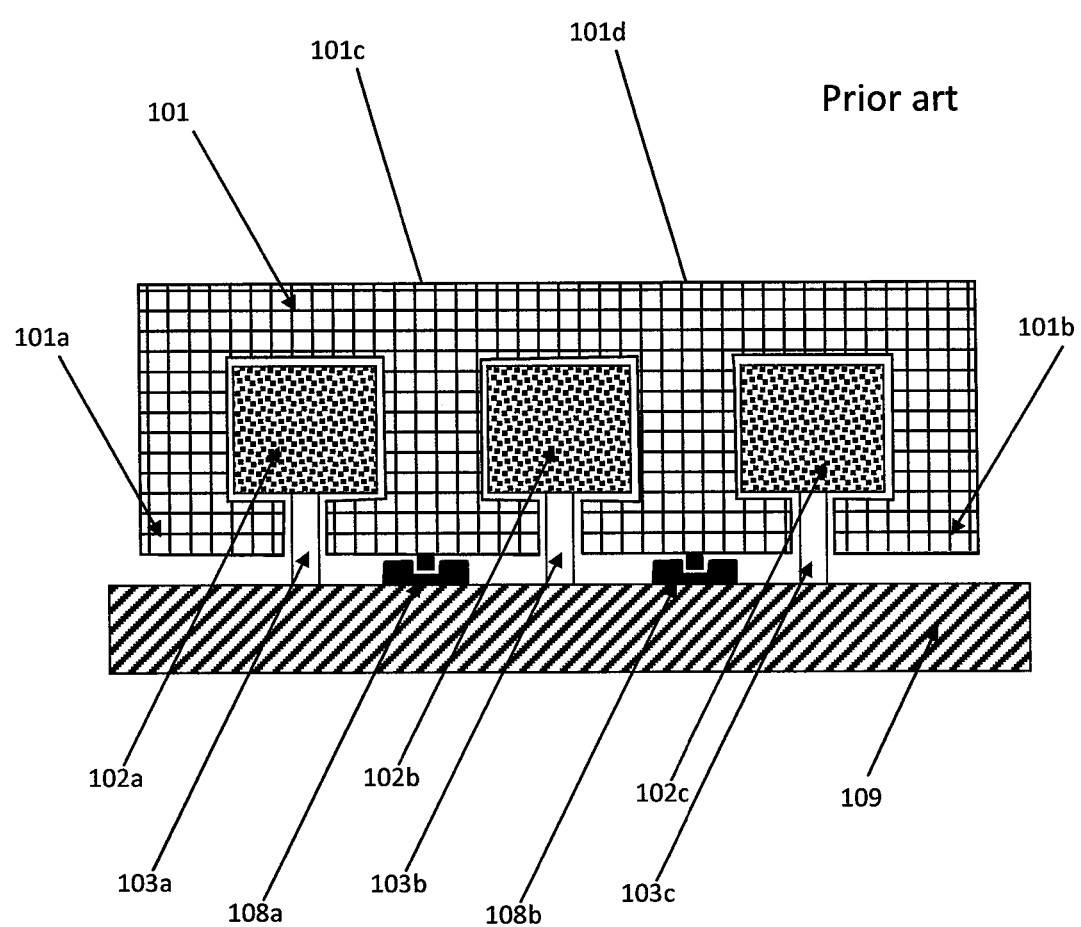
FIG. 1A is a front view of the same prior art.

In order to show the advantages provided by the preferred embodiment of the invention, a schematic view of the prior art Villaret design is shown for reference in FIG. 1 and FIG. 1A. A detailed explanation is found in U.S. Pat. No. 9,252,650 by Villaret.

Three linear structures, 102a, 102b and 102c are disposed parallel to the path of movement. Sections of windings are disposed in these linear structures. These linear structures are fixed to magnet rows 103a, 103b and 103c respectively. Magnetic circuit 101 surrounding these structures is moving along the path. For use in a machine, the working load is mounted on a carriage fixed to the magnetic circuit 101.

The rigid mechanical link between carriage and magnetic circuit 101 provides a path for the heat coming from the magnetic circuit losses. When the motor is operating at high speed and high force, a large and alternating current is run in the windings, creating a high magnetic field in the magnetic circuit. It is well known that magnetic circuits have magnetic losses that dissipate in the form of heat, due to the non-linear magnetic property of the magnetic material. These losses are proportional to the square of the alternating current frequency and thus the speed.

It is desirable to minimize heat dissipation on the moving elements, since the temperature rise on the working load can be problematic.

In a second aspect, the working force is applied sequentially between the magnet rows 103a, 103b and 103c and the magnetic circuit opening in which they are inserted. As a result, the working force on the carriage is sequentially applied at the three openings. If the gravity center of the carriage is for example in the center shown in G of FIG. 1, an alternating torsional torque is applied on carriage during movement. This alternating torque produces vibrations in relation with the mechanical rigidity of the moving elements. In order to avoid these vibrations, a very rigid mechanical system must be used, resulting in heavy and expensive construction.

Referring to FIG. 1A, there is shown an embodiment of the prior art Villaret design where the linear bearing 108a and 108b are shown. In this embodiment, the position of the bearing was selected for the best mechanical support of the magnetic circuit and the carriage. It can be seen that extremities 101a and 101b of the magnetic circuit are not directly supported, and thus will show some flexibility. They are subject to a variable attraction force to the magnet row. This variable magnetic force applied at these extremities will cause vibrations. These vibrations will in turn cause variations of the relative position of the magnet row and thus creates additional variation of the working force. Finally, undesirable vibrations will occur.

In order to avoid these vibrations, the system structure should be made very rigid in order to reduce their amplitude, resulting in a heavy and expensive system In another aspect, as can be seen in FIG. 1A, the volume of space enclosed between the base-plate 109, magnet rows 103a, 103b, 103c and the winding structure 102a, 102b and 102c is not easily accessible for the mounting of the magnetic circuit. In particular, magnetic circuit sections 101c and 101d, during the mounting process, should be mounted separately from the other sections of the magnetic circuit. Whenever the magnetic circuit is divided in several parts, the assembly process becomes very complex, in order to fix all parts together with high mechanical precision and also with high rigidity.

It is a principal object of the present invention to provide a transverse flux linear motor with the advantage of simplified structure, that allows a simple assembly process, and/or eliminates the transmission of heat on the moving carriage, eliminates the vibrations due to alternating torque applied to the magnetic circuits and reduces the number of magnet rows, thus reducing material and assembly costs.

Figure 2:
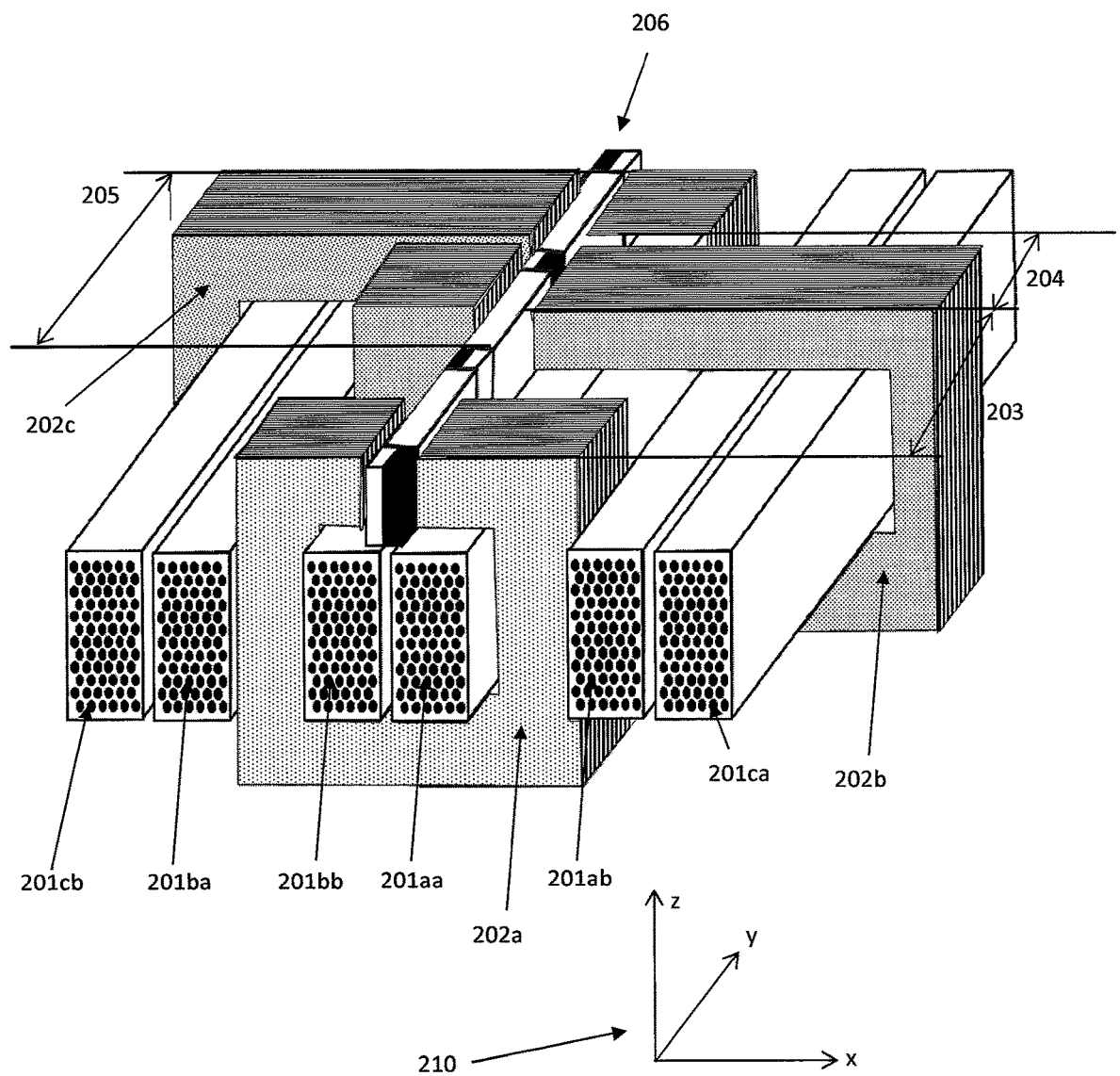
FIG. 2 is a schematic perspective view of an embodiment of the present invention.

Referring now to FIG. 2, there is shown a perspective view of a preferred embodiment of the present invention. A row of magnets 206 can linearly slide in the y direction of coordinate basis 210 inside the openings of three magnetic circuits 202a, 202b and 202c and relative to them. Depending on the configuration of the embodiment, either the magnetic circuits are static and the magnet row slides inside their openings, or the magnet row is static and the magnetic circuits are moving and enclosing the magnet row.

Figure 4:
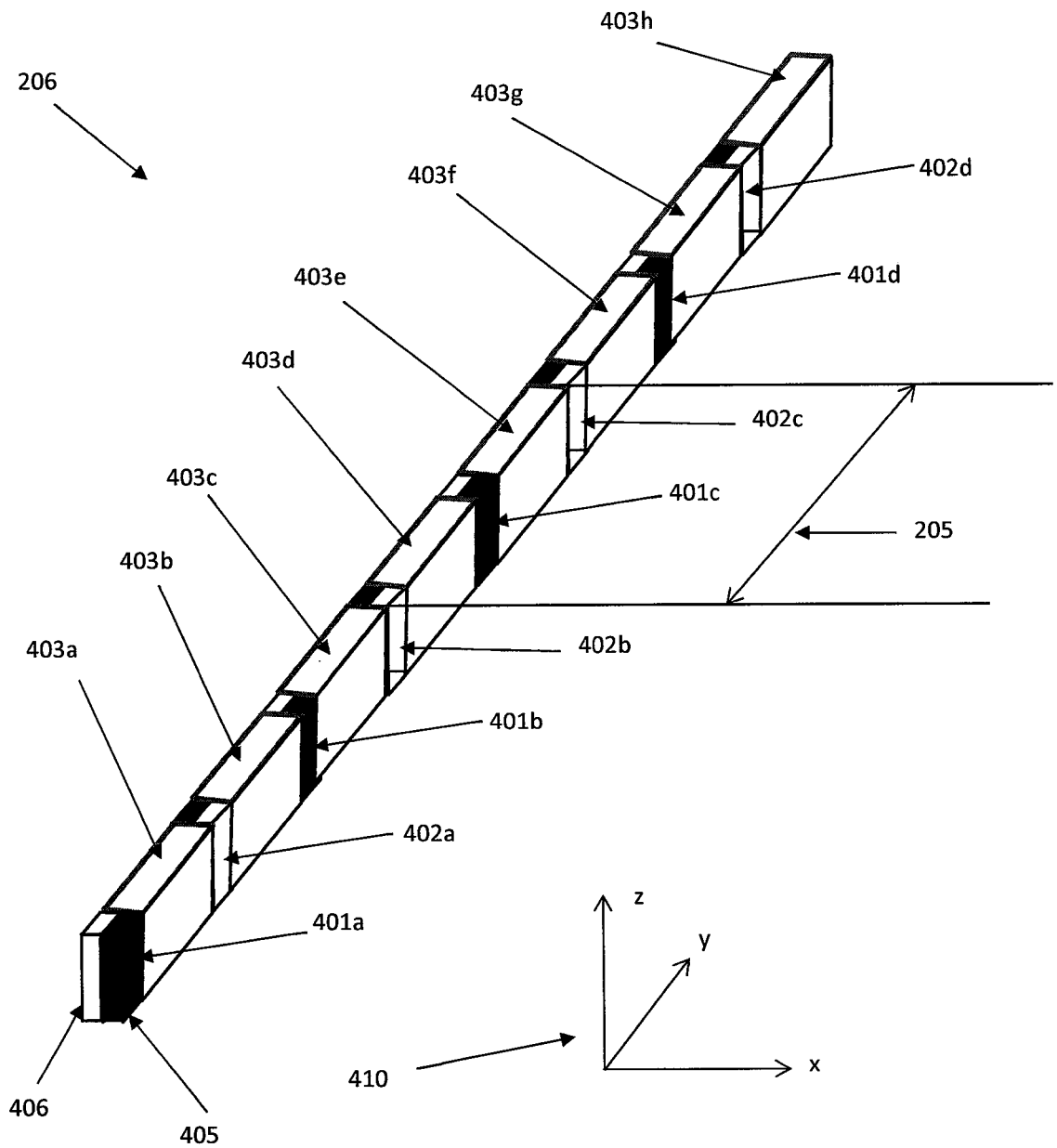
FIG. 4 shows a row of magnets used in embodiments of the present invention.

FIG. 4 shows a detailed description of the magnet row 206. The magnet row 206 is composed of magnets (401a 402a ... 401d 402d) and non-magnetic material sections 403a ... 403h. Magnets are equally distributed along the magnet row length, with alternate polarities. FIG. 4 shows the permanent magnets 401a-401d having a north pole 405 filled in black, and a south pole 406 with a magnetic field exiting the magnet in the positive x directions shown by coordinate 410. Permanent magnets 402a-402d are identical to permanent magnets 401a-401d, but have opposite orientation, and produce a magnetic field in the negative x direction. Permanent magnets 401a-401d and 402a-402d are alternately disposed at equidistance along the row 206. In the scope of this patent application, we shall refer to "period" as the distance between two magnets of the same polarity, as shown at 205 in FIG. 4 and FIG. 2.

Referring again to FIG. 2, long linear sections of windings 201aa, 201ab, 201ba, 201bb, 201ca, 201cb are disposed parallel to the sliding direction y. In the particular example of the preferred embodiment shown, the sections 201aa and 201ab are part of the same winding 201a shown in FIG. 3, so that the current running inside each section will be of opposite direction. The same applies to long linear winding sections 201ba with 201bb being part of winding 201b and long linear winding sections 201ca with 201cb being part of winding 201c. It must be understood that different winding arrangements can be done within the scope of this invention.

Magnetic circuits 202a, 202b and 202c are made of laminated magnetizable material such as iron and iron alloy or composite, as used in electrical motors and transformers.

Magnetic circuit 202a encloses long linear sections of windings 201aa and 201bb. Magnetic circuit 202b encloses long linear sections of windings 201aa, 201bb, 201ab, 201ca.

Magnetic circuit 202c encloses long linear sections of windings 201aa, 201bb, 201ba, 201cb.

The three magnetic circuits 202a, 202b and 202c are fixed to a common support (not shown). In this embodiment the distance between the magnetic circuits are shown in FIG. 2 as items 203, 204 and are respectively $5/6^{th}$ and $1/3^{rd}$ of a period.

Whenever there is a relative movement along the path, in the y direction, the permanent magnets create a variable magnetic flux in the magnetic circuits. Due to the periodic disposition of the permanent magnets in the magnet row, and the set distances between the magnetic circuits, the created flux is a periodic function of the position in the direction of the path. This variable flux in turn creates a voltage in the windings.

Each long linear winding section is enclosed by a number of magnetic circuits. The magnetic flux generated by the magnets of the magnet row generates a magnetic flux inside the magnetic circuits enclosing a long linear winding section. This generated flux traverses the winding of the long linear winding section, and a voltage is induced according to the time variation of the generated magnetic flux. Finally, on the whole winding, that includes a number of long linear winding sections, a voltage is induced as the sum of all induced voltages.

The flux in a magnetic circuit, as mentioned above, can be approximated to a sinusoidal function of the position x along the path. This is because of the periodic arrangement of the magnet row. The total flux for all the sections of a winding can be expressed as:

$$\Phi = \Phi 0 \cdot \sin(2 * \pi * x / \text{period} + \varphi),$$

$\Phi 0$ is a constant depending on the number of winding turns, the geometry and material of the magnetic circuit and the magnetic strength of the permanent magnets;

$\varphi$ is a phase depending on the position along the y direction of the magnetic circuit.

The voltage induced in the considered winding is defined by the flux time derivative:

$$E = d\Phi/dt = \Phi 0 (2 \cdot \pi / \text{period}) \cdot \cos(2 \cdot \pi \cdot x / \text{period} + \varphi) \cdot dx/dt$$

If we note the V as velocity of the relative movement between magnet row and magnetic circuits, then the voltage induced in the considered winding is:

$$E = \Phi 0 \cdot (2 \cdot \pi/\text{period}) \cdot \cos(2 \cdot \pi \cdot x/\text{period} + \varphi) \cdot V \quad \text{(eq. 1)}$$

If a current of intensity I is run into the considered winding, a magnetic power Pm=E.I is developed. Another known expression of the power is Pm=V*F (eq 2) where F is the force of the magnetic interaction.

Comparing eq. 1 and eq 2, an expression of the force F is obtained:

$$F = \Phi 0 \cdot (2 \cdot \pi/\text{period}) \cdot \cos(2 \cdot \pi \cdot x/\text{period} + \varphi) \cdot I$$

In the example of the preferred embodiment, there are three windings. A first winding 201a includes the long linear winding sections 201aa and 201ab, a second winding 201b includes the long linear winding sections 201ba and 201bb, the third winding 201c includes the long linear winding sections 201ca and 201cb. The magnetic circuits geometry and the windings can be designed so that the same constant Φ0 applies for all three winding. In addition, the set distances between magnetic circuit is such that the phase difference between the winding induced voltage is one third of the period, and for each winding 201a, 201b and 201c we can express the working force as:

$$Fu = \Phi 0 \cdot (2 \cdot \pi/\text{period}) \cdot \cos(2 \cdot \pi \cdot x/\text{period} + \varphi) \cdot Iu$$

$$Fv = \Phi 0 \cdot (2 \cdot \pi/\text{period}) \cdot \cos(2 \cdot \pi \cdot x/\text{period} + \varphi + 2 \cdot \pi/3) \cdot Iv$$

$$Fw = 0 \cdot (2 \cdot \pi/\text{period}) \cdot \cos(2 \cdot \pi \cdot x/\text{period} + \varphi + 4 \cdot \pi/3) \cdot Iw$$

Where Fu, Fv and Fw are the forces developed respectively by each winding current Iu, Iv and Iw in the respective windings 201a, 201b and 201c.

Electrical drives of the common type are able to drive sinusoidal current of the form:

$$Iu = I0 \cdot \cos(2*\pi*x/\text{period} + \varphi)$$

$$Iv = I0 \cdot \cos(2*\pi*x/\text{period} + \varphi + 2 \cdot \pi/3)$$

$$Iw = I0 \cdot \cos(2*\cdot*x/\text{period} + \varphi + 4 \cdot \pi/3),$$

where I0 is a constant proportional to the required force output

This results in a working force between magnet row 206 and magnetic circuits 202a, 202b, 202c:

$$F = Fu + Fv + Fw = (3/2) \cdot \Phi 0 \cdot (2 \cdot \pi/\text{period}) \cdot I0$$

The electrical linear motor is thus capable of developing a working force between the magnet row 206 and the magnetic circuits 202a, 202b, 202c, using only one magnet row 206.

The force is always applied between the magnet row 206 and the magnetic circuits, in the y direction shown in 210.

Figure 3:
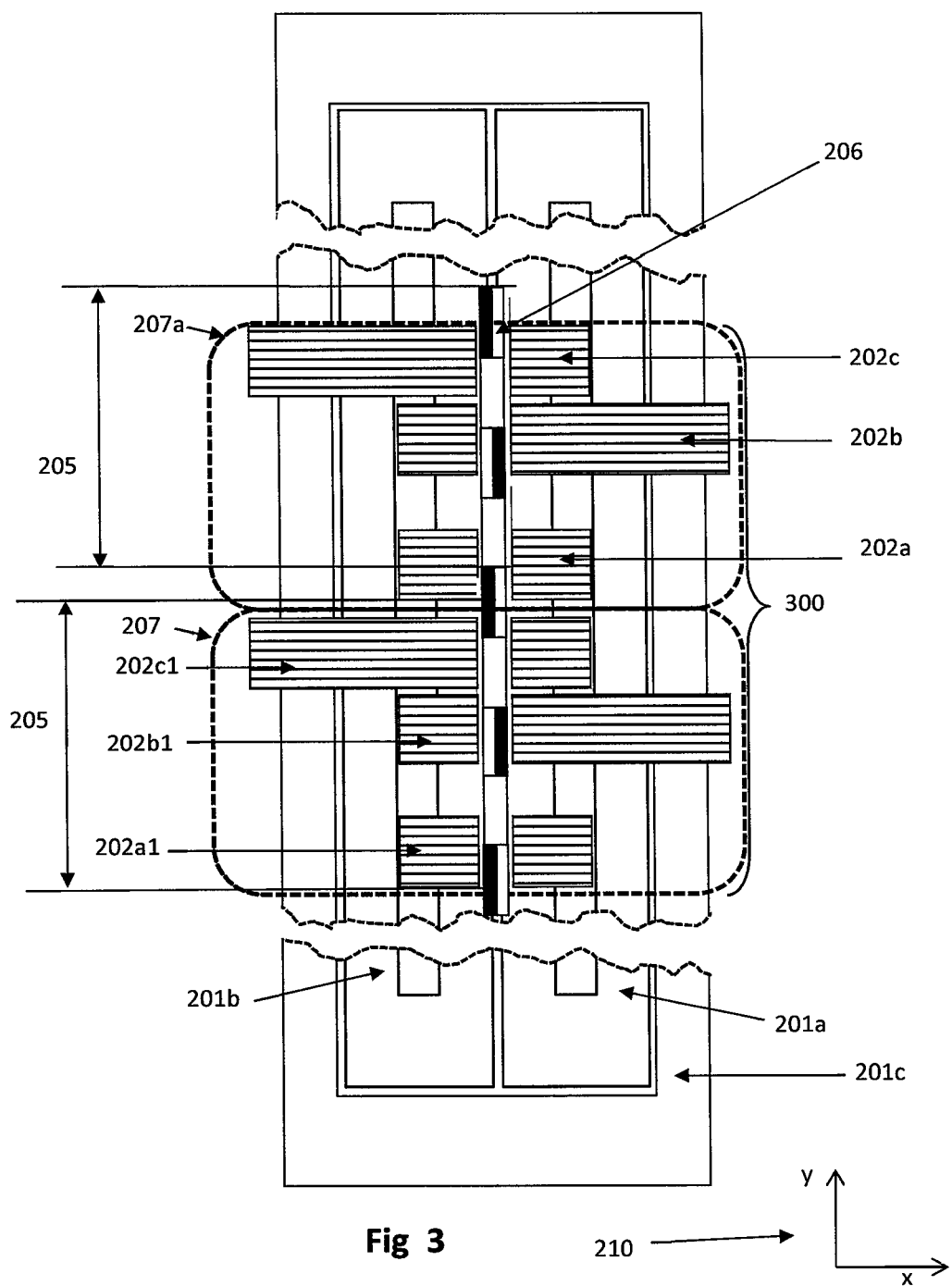
FIG. 3 is a view from above of the same embodiment.

The three magnetic circuits 202a, 202b, 202c shown in FIG. 2 form a set of magnetic circuits extending on a length along the movement path. Any number of such sets can be used, disposed along the path and mechanically linked in order to obtain a high working force. This is shown in the top view of FIG. 3. A portion of a linear motor according to the preferred embodiment is seen showing two sets of magnetic circuits like 207 disposed along two period lengths. The set of magnetic circuits 207 is shown in FIG. 3 including three magnetic circuits 202a1, 202b1 and 202c1. There may any number of such magnetic circuit sets like 207, in order to develop the required working force for the given application.

The principle of the electrical motor of the present patent application has been described where the working force is developed between the magnet row and the magnetic circuits.

This principle can be applied for different configurations of the moving and static elements.

Figure 5:
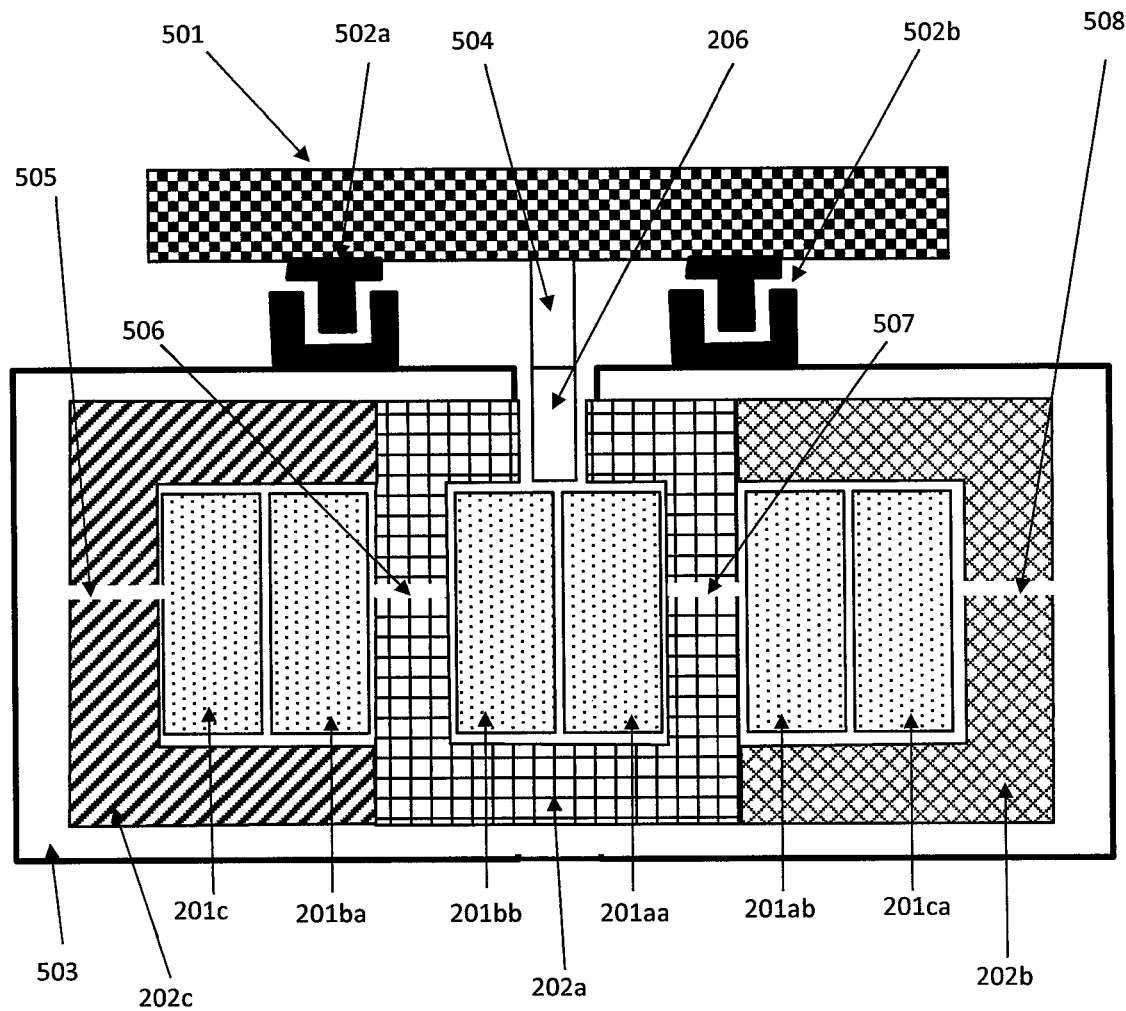
FIG. 5 shows an embodiment with static magnetic circuits and windings and moveable carriage fixed to the magnet row.

In a first configuration shown in FIG. 5, the winding and the magnetic circuits are static, and the magnet row is moving. A moving carriage 501 is sliding in a direction perpendicular to the plane of the figure, by means of two linear bearings 502a and 502b, over a frame structure 503. A number of set of magnetic circuits 202a, 202b and 202c are fixed inside the frame structure 503, all along the moving range of the linear motor. A magnet row 206 is fixed to carriage 501 by mean of a fixing bar 504, and slides inside the openings of the magnetic circuits.

Figure 6:
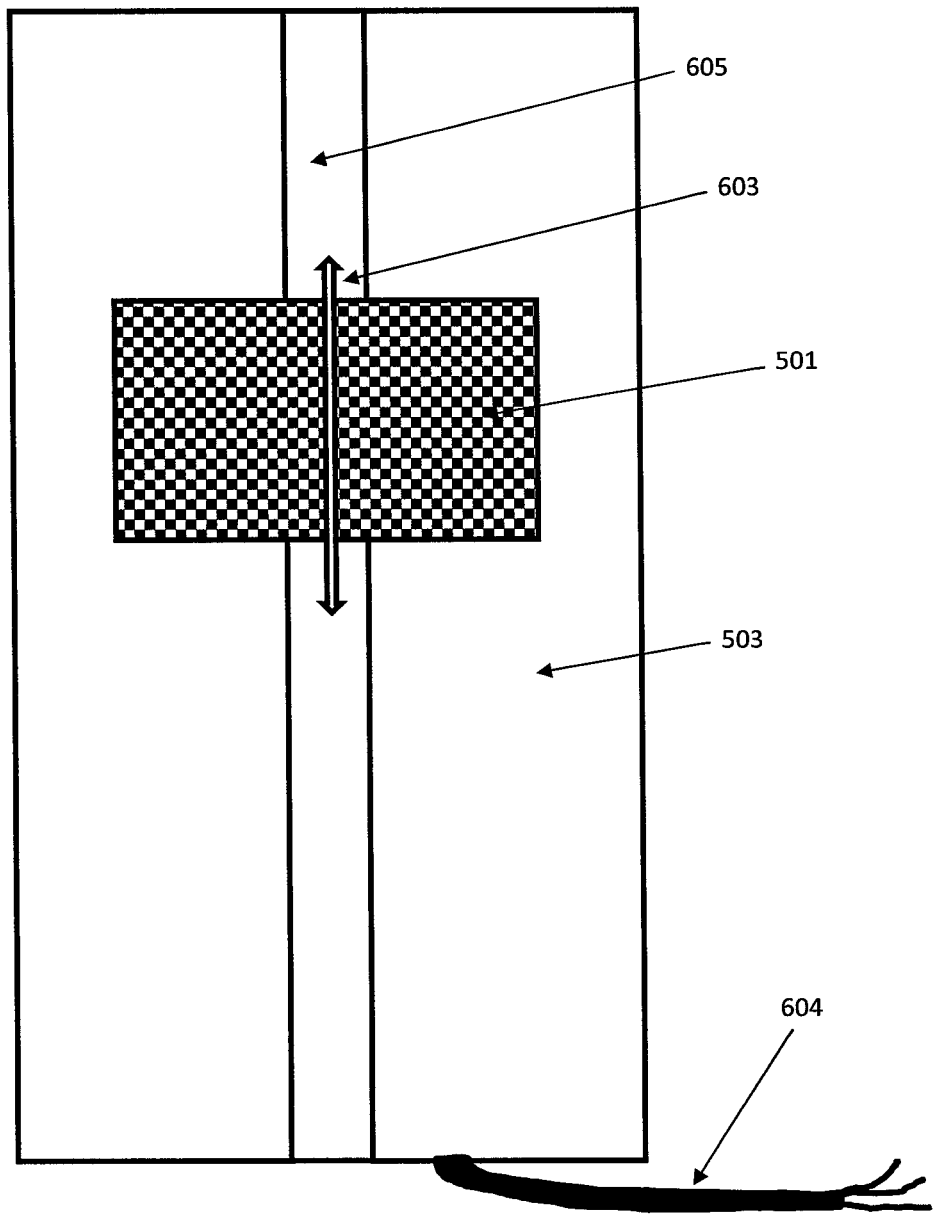
FIG. 6 is a top view of the embodiment of FIG. 5.

FIG. 6 shows a top view of this configuration. The sets of magnetic circuits are under the upper surface of the frame structure 503, and the carriage 501 can move above the openings 605 of the magnetic circuits. The magnet row is situated under the carriage 501, and its length is made shorter than the carriage length. The arrow 603 shows the sliding direction.

To allow the assembling process, the magnetic circuits must be divided in several sections. In FIG. 5 are shown separating lines 505, 506, 507 and 508. For clarity these separating lines are shown as gap between the upper and lower parts of the magnetic circuits. It must be understood that these gaps are very small and negligible, and during the assembly process the upper and lower parts are put in contact in order to ensure the continuity of the magnetic path. The magnetic circuit 202a is divided in upper and lower part by gap 506 and 507. Magnetic circuit 202b is divided in upper and lower part by gap 508 and another gap not visible in FIG. 5 and situated behind magnetic circuit 202a. Magnetic circuit 202c is divided in upper and lower part by gap 505 and another gap not visible in FIG. 5 and situated behind magnetic circuit 202b. In the assembly process, lower part of magnetic circuit is first placed in the frame structure 503, then windings are put in place, then upper parts of magnetic circuits are put in place.

In this first configuration shown in FIG. 5 and FIG. 6, the magnet row is shorter than the length over which the magnetic circuit extends. It must be understood that the same configuration can be used where the magnet row is longer than the magnetic circuit. Such configuration can be useful for example in milling machines, in which the carriage is large and holds the working piece, and entirely covers and protects the static windings and magnetic circuits.

A first particular advantage of this configuration is the small weight of the moving parts. This allows high accelerations and thus increased operating speed when used in automatic machines.

A second particular advantage is that the moving part is passive, i.e. no moving cable is needed.

Figure 7:
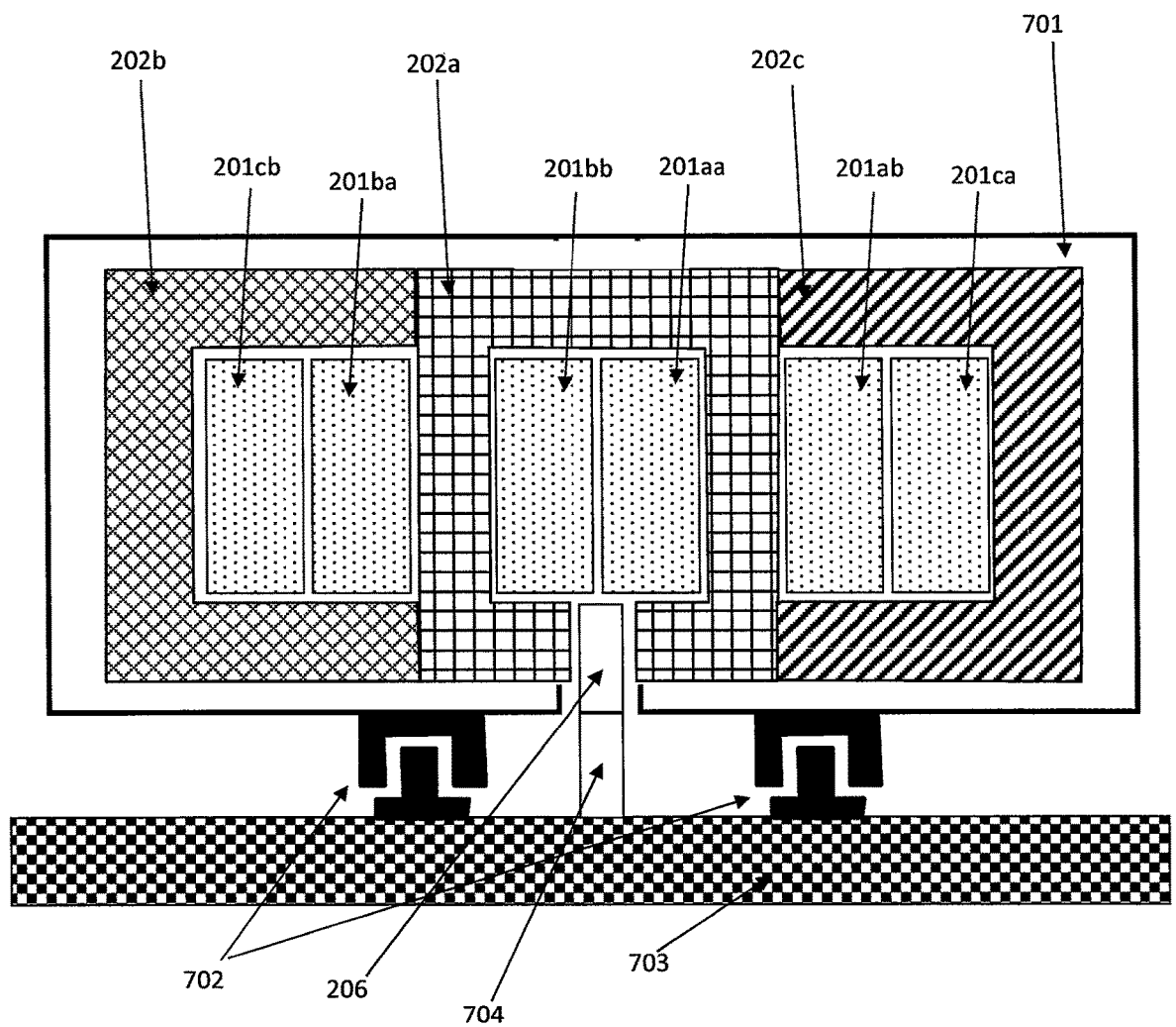
FIG. 7 shows an embodiment with a static magnet row and windings and moveable carriage fixed to magnetic circuits.
Figure 8:
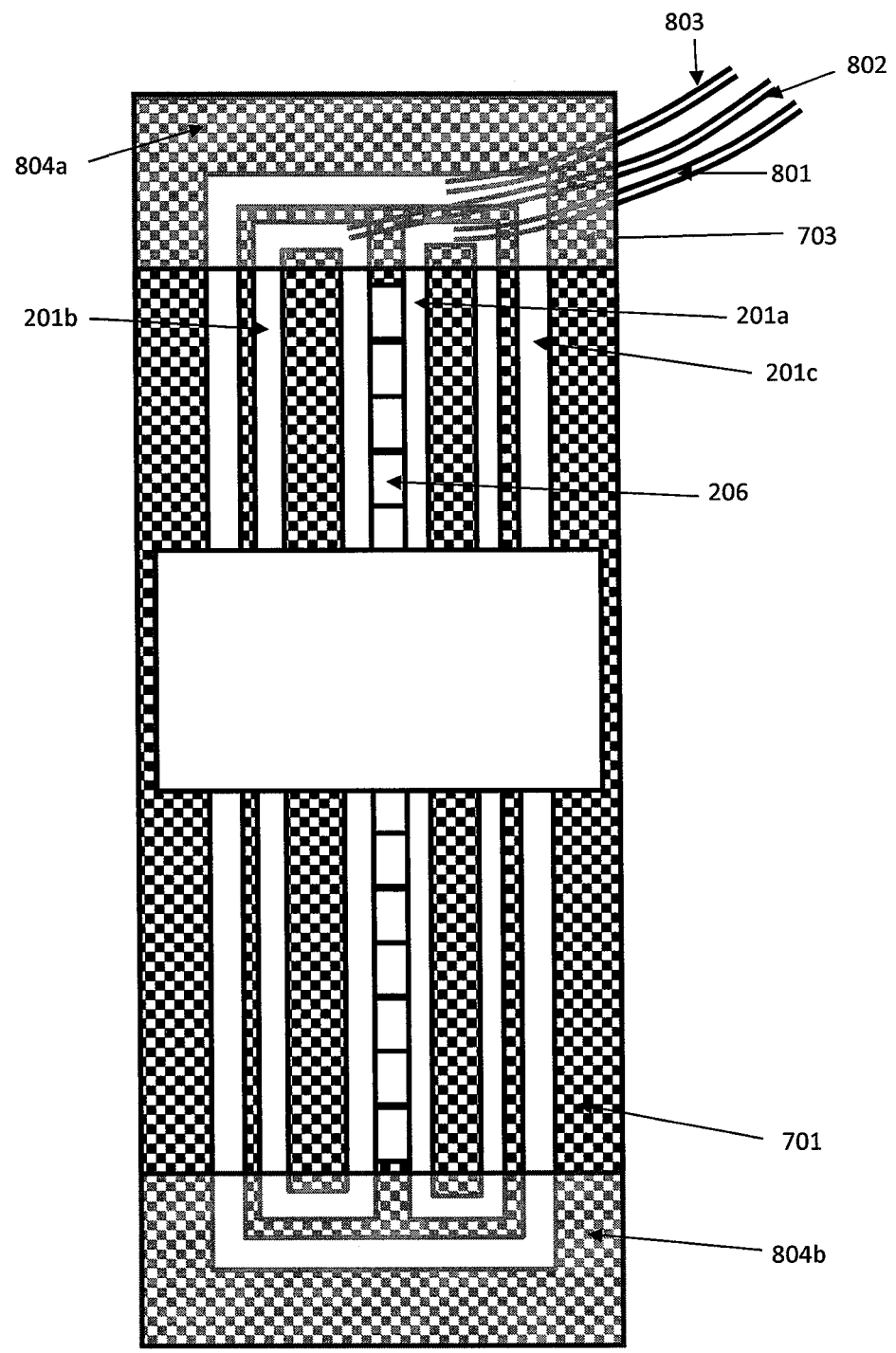
FIG. 8 is a top view of the embodiment of FIG. 7.

In a second configuration, shown in FIG. 7 and FIG. 8, the magnet row and the windings are static, and the magnetic circuits are movable along the path. The magnet row 206 is fixed to a base plate 703 by means of a fixing bar 704, and fits inside the magnetic circuit openings. A holding structure 701 slides along the path by means of linear bearings 702. Inside the holding structure 701 are fixed a number of sets of the magnetic circuits like 202a, 202b and 202c. The magnetic circuits enclose and slide along the long linear sections of windings 201aa, 201ab, 201ba, 201bb, 201ca, 201cb.

In FIG. 8 there is shown a top view of this configuration. The windings are fixed to the base plate by means of two clamping structures 804*a* and 804*b*, by their extremities. The windings are designed according to well-known techniques in order to have a sufficient rigidity. It must be understood that the working force is not acting on the windings, so that the windings should be designed to self-support only.

A first particular advantage of this configuration is that no moving cable is needed.

A second particular advantage, compared with the first configuration, is that only part of the long sections of the winding are surrounded by magnetic material. This reduces the magnetic loss and the inductance of the winding. This increases the efficiency of the motor.

Figure 9:
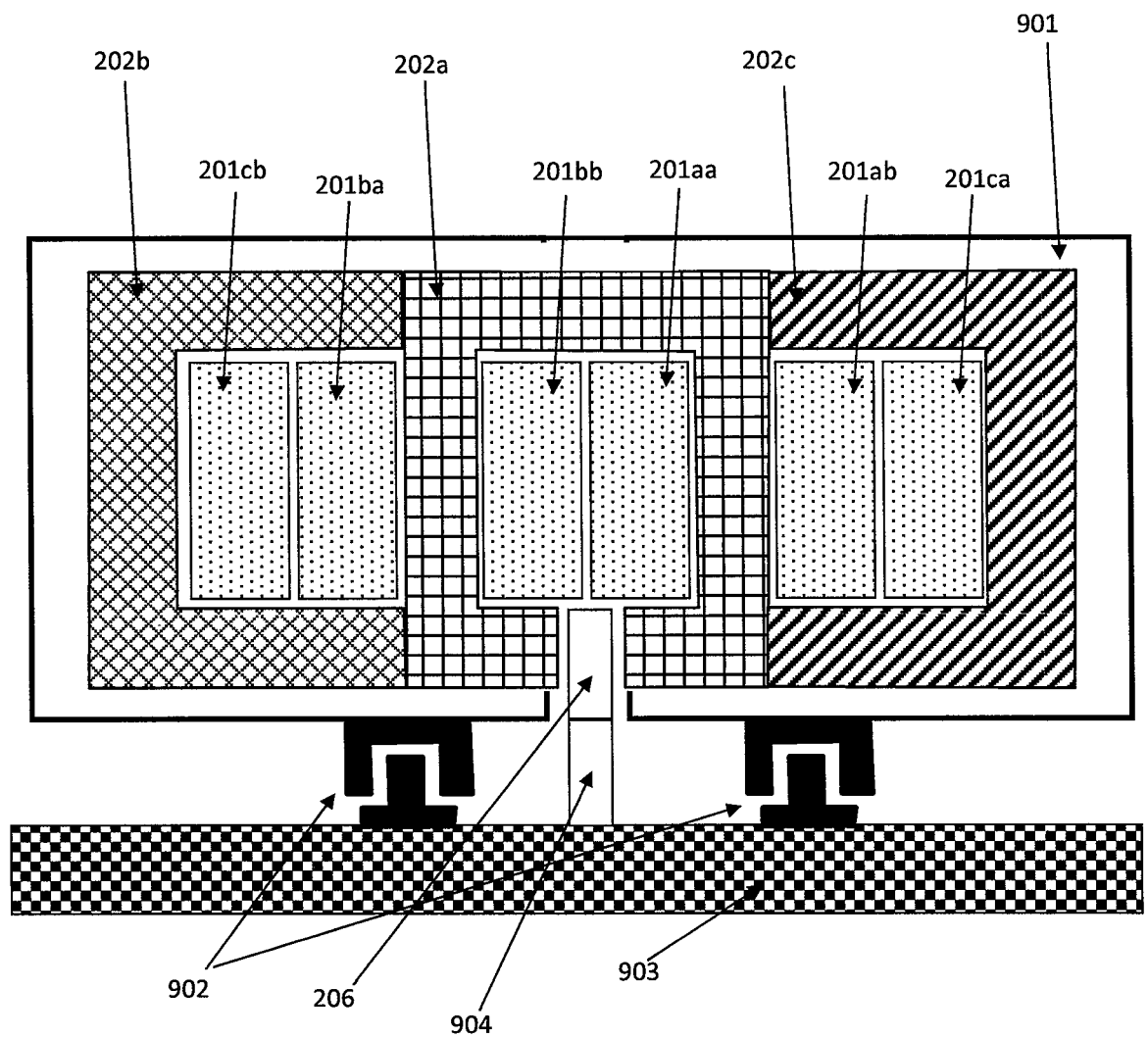
FIG. 9 shows an embodiment with static magnet row and moveable carriage fixed to magnetic circuits and windings.
Figure 10:
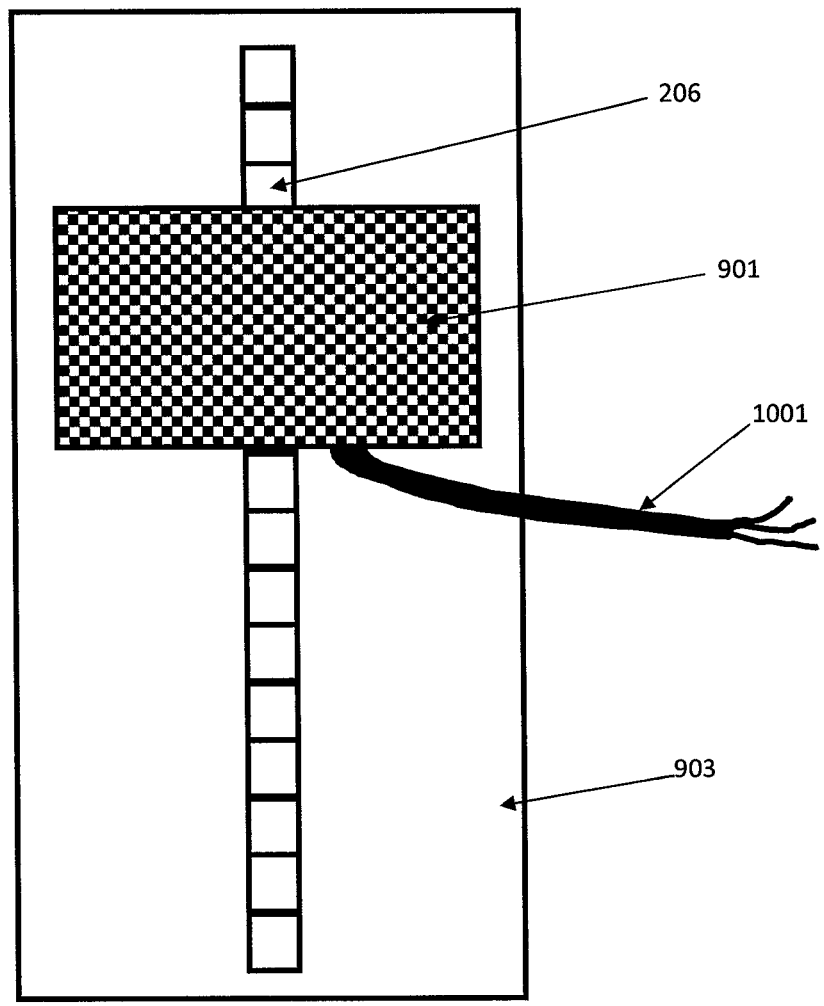
FIG. 10 is a top view of the embodiment of FIG. 9.

In a third configuration, shown in FIG. 9 and FIG. 10, the magnet row is static, the windings and the magnetic circuits slide along the path. Magnet row 206 is fixed to a base plate 903 by means of a solid bar 904. A holding structure 901 slides over the base plate by means of linear bearings 902. Magnetic circuits 202*a*, 202*b* 202*c* and windings are fixed inside the holding structure 901. In FIG. 9, the long linear sections of windings 201*aa* 201*ab* 201*ba* 201*bb* 201*ca* and 201*cb* can be seen. The openings of all magnetic circuits are all aligned along the path with the magnet row inside.

In FIG. 10 there is shown a top view. The windings and magnetic circuits are fixed inside the holding structure 901, which slides over the base plate 903. The electric cable connecting the windings 1001 to the driver (not shown) moves with the holding structure. The advantage over previous configurations is that the windings are shorter, thus reducing their resistance and power loss. However, in this configuration, moving cables are needed to provide the power to the windings.

Common advantages to all three configurations shown above are:

a) Working force is always applied between the magnet row and the magnetic circuit openings. This ensures a smooth movement, without vibrations.

b) No force is applied at the extremities and no vibrations of the magnetic circuit are induced. A lighter holding structure can be used, for a lower weight and cost.

c) Easy assembly. Moving and static parts can be assembled separately, and then put together. For easy assembly the magnetic circuits can be divided in several parts, as for example shown in FIG. 5 by separating line 505, 506, 507 and 508.

d) There is no attraction force between the relative moving parts other than the working force. This is because the magnet row is equally attracted by both ends of the openings.

Figure 11:
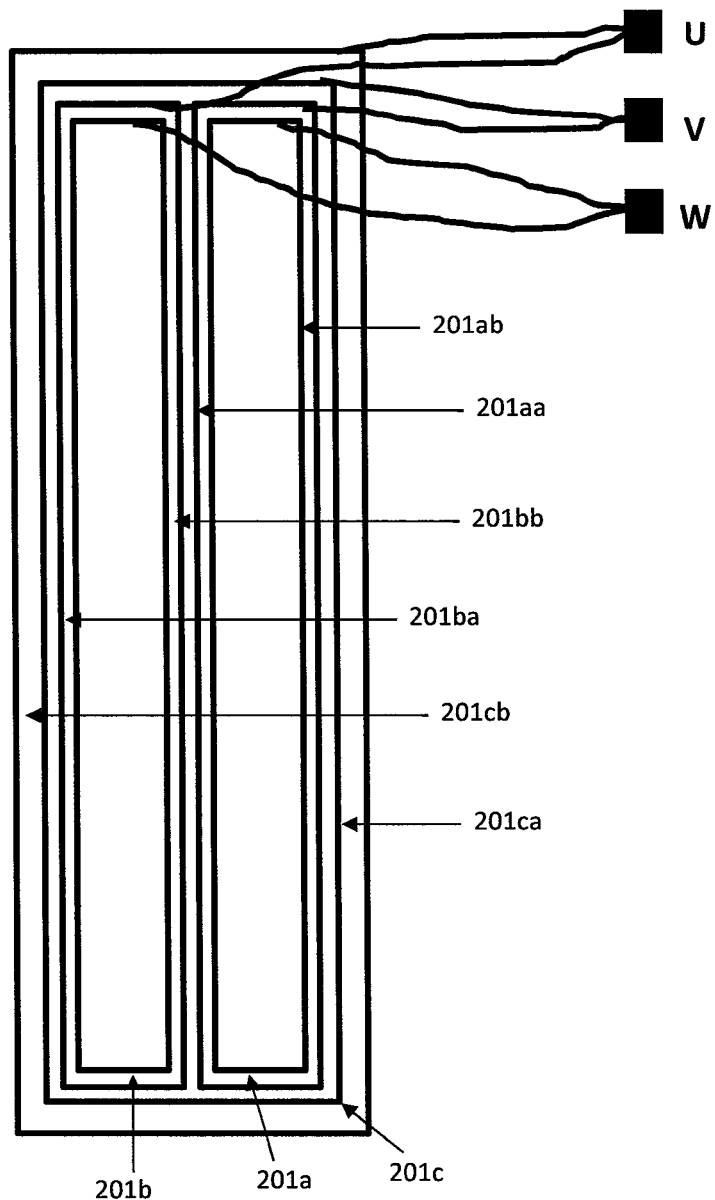
FIG. 11 shows a "delta" connection of the windings to a three phase current supply.

In FIG. 11 there is shown a winding shape for the windings 201*a*, 201*b* and 201*c*. Each winding includes several "turns" of a conducting wire. Each turn of wire extends along the winding shape. The rectangular shape of the windings provide long linear winding sections as 201*aa*, 201*ab* 201*ba* 201*bb* 201*ca* 201*cb*. Also shown is the electrical connection to a three phase controller (drive). The connection shown here is commonly called a "Delta" configuration.

Figure 12:
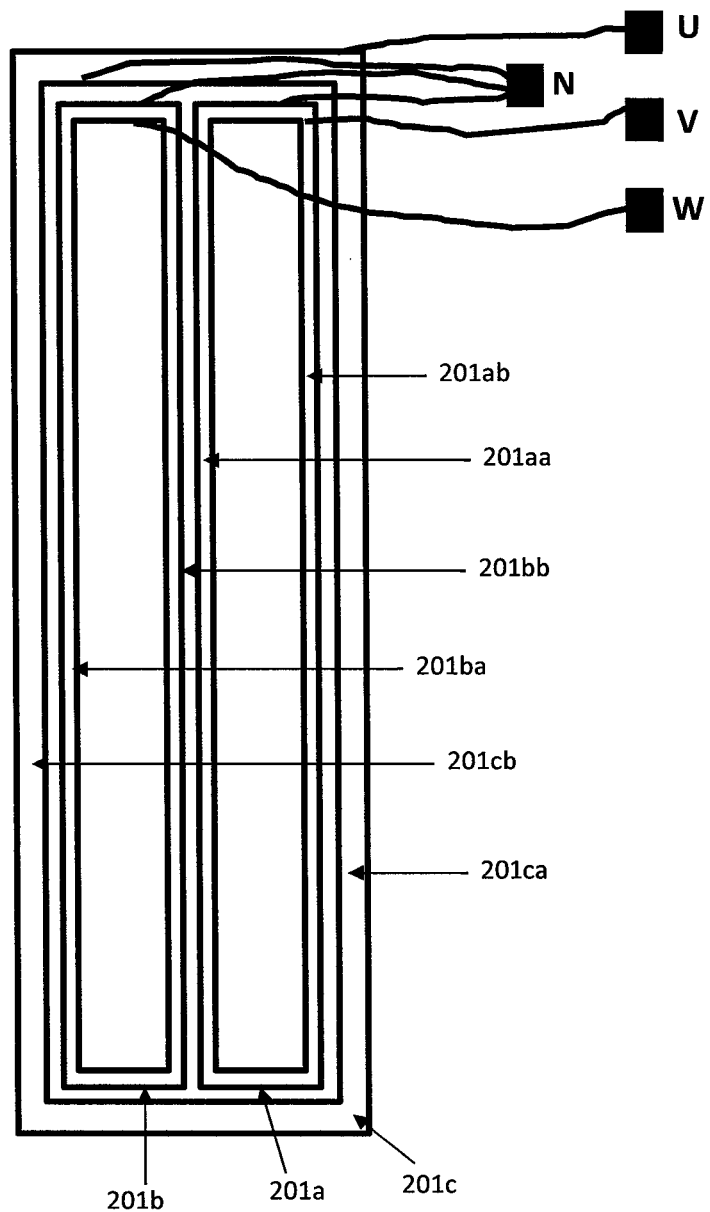
FIG. 12 shows a "star" connection of the windings to a three phase current supply.

In FIG. 12 there is shown the windings shape for the windings 201*a*, 201*b* and 201*c*. Also shown is the electrical connection to a three phase controller (drive). The connection shown here is o commonly called a "Star" configuration.

Figure 13:
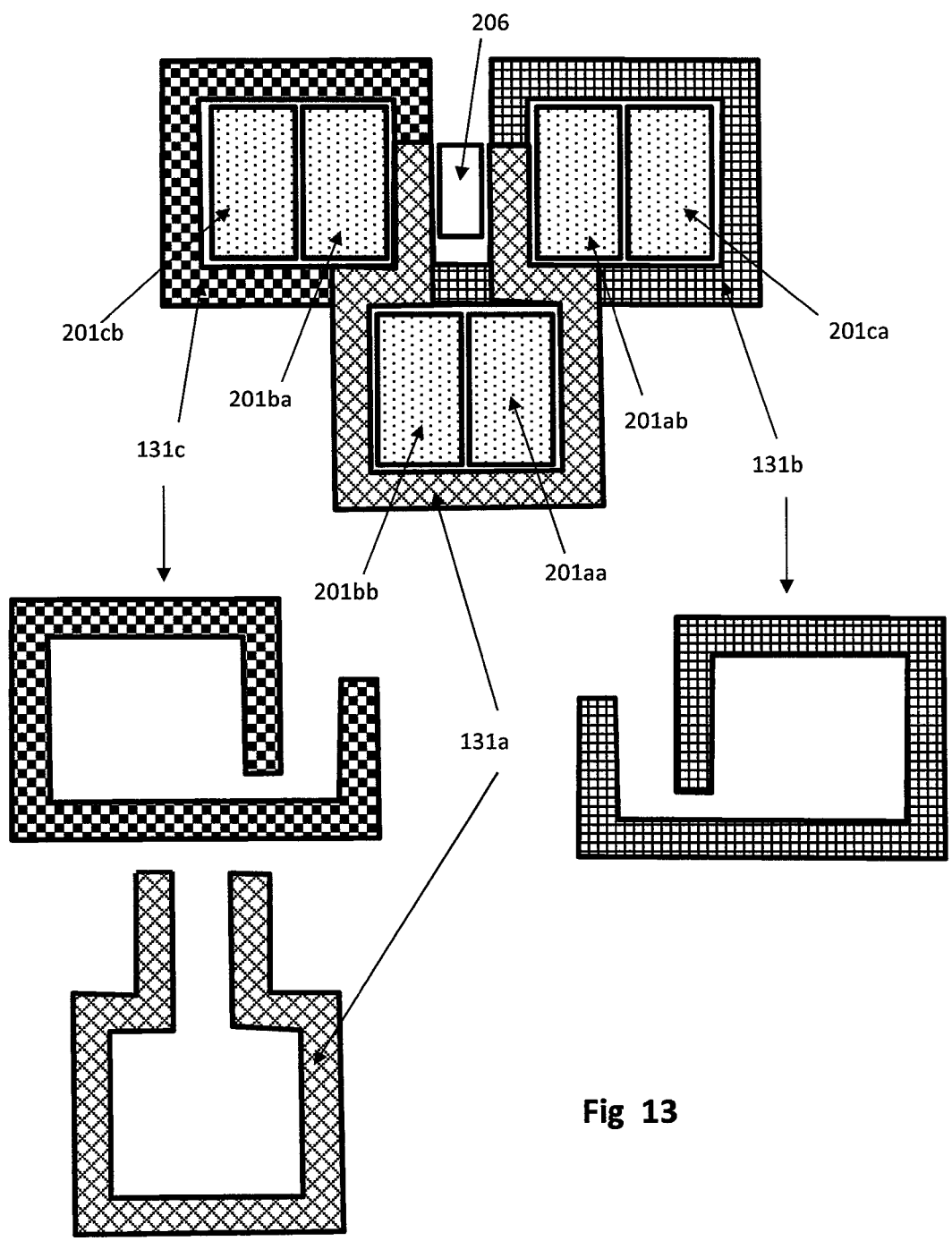
FIG. 13 shows the geometrical shape of the magnetic circuits for a second embodiment.

In FIG. 13 there is shown another example of an embodiment. In this embodiment, the magnetic circuit shape is designed so that magnetic circuit 131*a* encloses the set of windings in long linear winding sections 201*bb* and 201*aa*, magnetic circuit 131*b* encloses the set of windings in long linear winding sections 201*ab* and 201*ca*, and the magnetic circuit 131*c* encloses the set of windings in long linear winding sections 201*cb* and 201*ba*. The particular shapes used here provide openings in which the magnet row 206 can be easily inserted inside the openings.

In the embodiments where the magnetic circuits extend over the whole length of the motor, and the magnet row is shorter, like for example the first embodiment described above in FIG. 5 and FIG. 6, then only part of the magnetic circuits receives the magnet row; other magnetic circuits have their opening left open. The winding current still creates magnetic flux in these circuits. In order to develop high force, it is desirable to use a thin magnet row; this is because the permanent magnet material has a low permeability, and thus the magnetic conductance of the magnetic circuit rapidly decreases with the thickness of the permanent magnets. However, in a second aspect, the magnetic circuits that do not receive the magnet row have also a relatively low magnetic conductance. This will result in a high inductance of the windings, with high magnetic losses and will have a negative effect on the motor performance.

Figure 14:
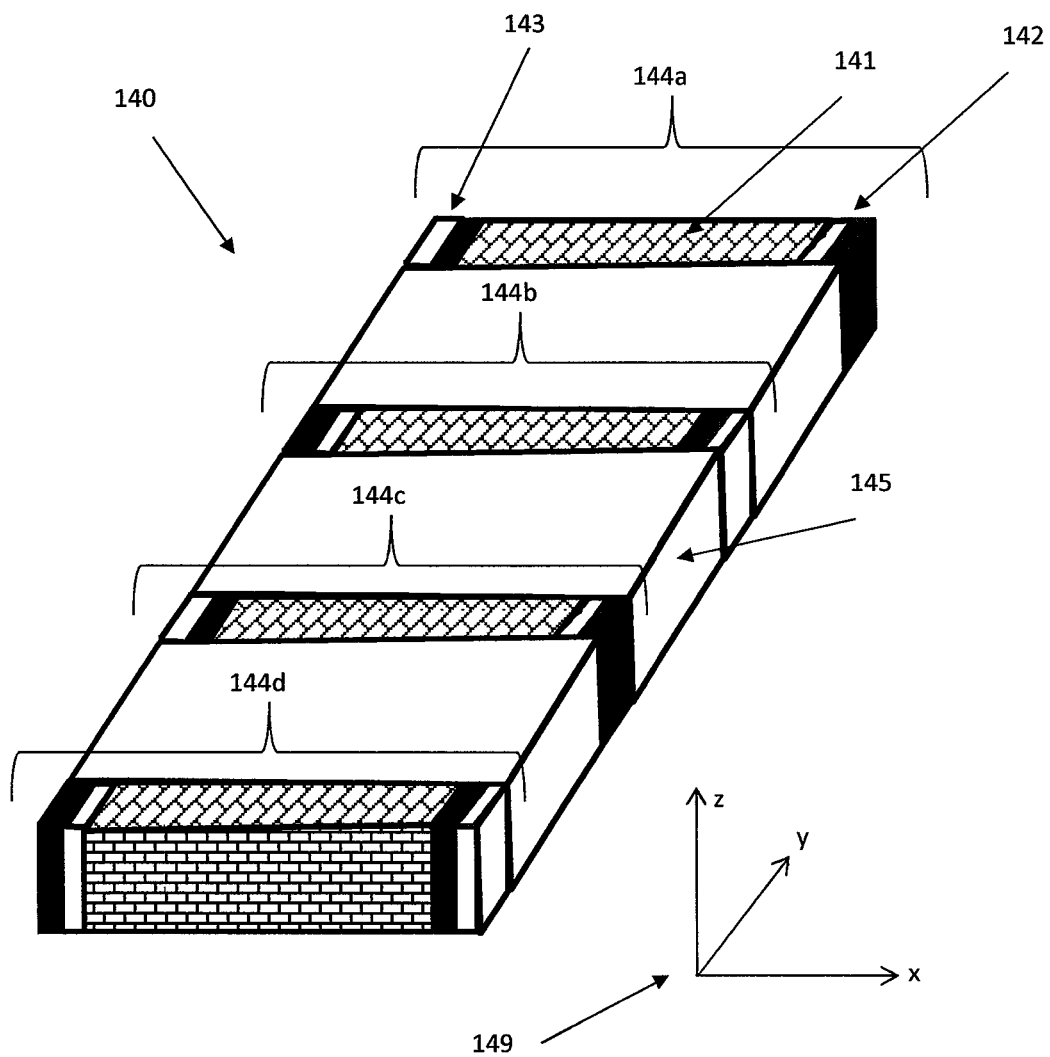
FIG. 14 shows a wider magnet row as an alternative to the embodiment of FIG. 4.

In order to avoid this situation, a wider magnet row having a high magnetic conductance is used. Such a magnet row 140 is shown in FIG. 14. Four magnet modules 144*a*, 144*b*, 144*c* and 144*d* are shown, each module including two magnets of the same polarity like 142 and 143, and a magnetizable material such as iron 141 between them. The opening of the magnetic circuits is sized to receive this wider magnet row. When inserted in the opening of the magnetic circuits, magnet 142 is in front of the right side of the opening, and magnet 143 in front of the left side. The four magnet modules are equidistant along the path of movement shown as the y direction of the coordinate basis 149. The four magnet modules are fixed together by means of a non-magnetic material as shown by 145 between magnet modules 144*b* and 144*c*.

Whenever such a magnet row like 140 is used, then the magnetic conductance of the magnetic circuits receiving the magnet row is high, because the magnetic material like 144 provides a good magnetic path, and the magnets are relatively thin. By contrast, the magnetic circuits that do not receive the magnet row have a low magnetic conductance, due to the larger size of the openings. In this way, the inductance of the winding is reduced The invention has been described herein according to the preferred embodiments. It must be understood that many variations of the embodiments can be used according to the same principle, where a) the magnetic circuits provide aligned openings to receive one unique row, and b) each magnetic circuits enclose a set of long sections of the windings and at least two magnetic circuits enclose different set of long sections.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. An electrical linear motor for producing linear motion along a path from an input electrical current, said electrical linear motor comprising:

a plurality of electrical windings each having at least one long linear winding section, a plurality of said long linear winding sections being arranged parallel to said linear path of the motor;

a single row of magnets arranged parallel to said linear path and said magnets are placed in periodic position with alternating magnetic field direction perpendicular to said linear path of the motor; and a plurality of magnetic circuits, each magnetic circuit enclosing a number of said long linear winding sections, at least two of said magnetic circuits enclosing a different set of long linear winding sections, wherein each magnetic circuit is provided with an opening receiving said single magnet row, such that when electrical current is input to each one of said plurality of electrical windings, a magnetic force is developed parallel to said linear motion path, said magnetic force acting on said single magnet row and said magnetic circuits, causing said single magnet row and said magnetic circuits to slide along said linear path relatively to each other, wherein said magnetic circuits respectively comprise:

a) a first magnetic circuit enclosing one long linear section of first windings, two long linear sections of second windings and one long linear section of third windings, b) a second magnetic circuit enclosing one long linear section of said second windings and one long linear section of said third windings, and c) a third magnetic circuit enclosing one long linear section of said first windings, one long linear section of said second windings and two long linear sections of said third windings.

2. The motor of claim 1 wherein said magnetic circuits are static and said magnet row is movable, such that said magnetic force between said static and movable elements is obtained by applying said electrical current in said electrical windings, wherein each said magnetic circuit produces a force as a function of a) the position of said magnet row and b) the instantaneous amplitude of said current at said position in said enclosed long linear winding sections.

3. The motor of claim 2 wherein said magnetic force is the sum of all the forces produced by all said magnetic circuits and a required force value is obtained by controlling said electrical current in said electrical windings for each position of said movable magnet row relative to said magnetic circuits.

4. The motor of claim 2 wherein said electrical windings are static, and said magnetic circuits are arranged in a number of groups along said linear path.

5. The motor of claim 4 including several groups of said magnetic circuits to produce a higher force.

6. The motor of claim 1 wherein said electrical windings and said magnet row are static, and said magnetic circuits are movable along said linear path, such that said magnetic force between said static and movable elements is obtained by applying said electrical current in said electrical windings, wherein each said magnetic circuit produces a force as a function of a) the position of said magnetic circuit and b) the instantaneous amplitude of said current at said position in said enclosed long linear winding sections.

7. The motor of claim 6 wherein said magnetic force is the sum of all the forces produced by all said magnetic circuits and a required force value is obtained by controlling said electrical current in said electrical windings for each position of said magnet row relative to said magnetic circuits.

8. The motor of claim 1 wherein said magnet row is static, and said magnetic circuits and said electrical windings are movable along said linear path, such that said magnetic force between said static and movable elements is obtained by applying said electrical current in said electrical windings, wherein each said magnetic circuit produces a force as a function of a) the position of said magnetic circuit and b) the instantaneous amplitude of said current at said position in said enclosed long linear winding sections.

9. The motor of claim 8 wherein said magnetic force is the sum of all the forces produced by all said magnetic circuits and a required force value is obtained by controlling said electrical current in said electrical windings for each position of said magnet row relative to said magnetic circuits.

10. The motor of claim 1 wherein at least one of said magnetic circuits encloses more than two of said long linear winding sections.

11. The motor of claim 1 wherein said magnetic circuits have a shape designed to
a) enclose a number of said long linear winding sections, and
b) provide an opening for sliding over and along said single magnet row therein.

12. The motor of claim 1 wherein said magnetic circuits are arranged in multiple groups to produce a higher magnetic force.

13. The motor of claim 1 wherein said first and second magnetic circuits are separated by a distance equivalent to one third of said magnet row period, and said second and third magnetic circuits are separated by a distance equivalent to ⅚ ths of said magnet row period.

14. The motor of claim 1 provided as a simplified construction having a reduced heat dissipation.

15. The motor of claim 1 provided as a simplified construction having a reduced vibration.

* * * * *